United States Patent
Okamura et al.

(10) Patent No.: US 7,258,473 B2
(45) Date of Patent: Aug. 21, 2007

(54) VEHICLE LAMP

(75) Inventors: Takeaki Okamura, Tokyo (JP); Asaki Ichikawa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/077,534

(22) Filed: Mar. 11, 2005

(65) Prior Publication Data

US 2006/0083016 A1 Apr. 20, 2006

(30) Foreign Application Priority Data

Mar. 19, 2004 (JP) .............................. 2004-081134

(51) Int. Cl.
*F21S 8/10* (2006.01)

(52) U.S. Cl. ...................... 362/545; 362/328; 362/511; 362/518; 362/522

(58) Field of Classification Search ................ 362/545, 362/327, 328, 329, 543, 544, 511, 518, 522
See application file for complete search history.

(56) References Cited

U.S. PATENT DOCUMENTS

| | | | | |
|---|---|---|---|---|
| 2,215,900 A | * | 9/1940 | Bitner | ........................ 362/309 |
| 5,197,792 A | * | 3/1993 | Jiao et al. | .................... 362/623 |
| 6,097,549 A | * | 8/2000 | Jenkins et al. | .............. 359/726 |
| 6,099,156 A | * | 8/2000 | Jenkins et al. | .............. 362/511 |
| 6,290,371 B1 | * | 9/2001 | Feger et al. | ................. 362/217 |
| 6,814,475 B2 | * | 11/2004 | Amano | ........................ 362/487 |
| 6,951,415 B2 | * | 10/2005 | Amano et al. | .............. 362/520 |
| 6,953,271 B2 | * | 10/2005 | Aynie et al. | ................. 362/511 |
| 2003/0112634 A1 | | 6/2003 | Hideyuki et al. | ........... 362/487 |

* cited by examiner

*Primary Examiner*—Renee Luebke
*Assistant Examiner*—Gunyoung T. Lee
(74) *Attorney, Agent, or Firm*—Cermak, Kenealy & Vaidya, LLP

(57) ABSTRACT

A vehicle lamp can include a first light source located almost at the center of an emission region, and a transparent cover lens arranged to cover the front in the direction of illumination from the first light source. A central reflective portion of the cover lens can be located in front of the first light source to receive light from the first light source and reflect it toward the entire circumference in a direction almost perpendicular to the direction of illumination. A diametrical outer reflective portion can be located at the rim of the cover lens to receive the light from the first light source and reflect it along the direction of illumination for radial emission. The central reflective portion and the outer reflective portion of the cover lens can be integrated with a joint portion of the same material.

20 Claims, 3 Drawing Sheets

VEHICLE LAMP

This application claims the priority benefit under 35 U.S.C. §119 of Japanese Patent Application No. 2004-081134 filed on Mar. 19, 2004, which is hereby incorporated by reference.

BACKGROUND OF THE INVENTION

1. Field of the Invention

The invention relates to lamps for vehicles and vehicle-related applications. More particularly, it relates to a vehicle lamp configuration capable of achieving an improved design by use of a transparent cover lens that raises patterns that shine radially near the rim of the cover lens and that use light from an LED lamp.

2. Description of the Related Art

A conventional vehicle lamp includes an incandescent bulb located almost at the center of an emission surface of the lamp, and a reflective surface provided for the incandescent bulb in the emission surface. A recess is formed in the reflective surface concentrically surrounding the incandescent bulb. LED lamps are located in the recess. The recess also serves as a reflector for the LED lamps.

When driving at night, the incandescent bulb is normally turned on to serve as a tail lamp and, when a brake is employed, the LED lamps are turned on to serve as a stop lamp. Thus, the fast-response LED lamps are employed in a high-emergency on/off use and the slow-response incandescent bulb is employed such that it is normally on to improve safety.

In addition, the LED lamps can be located around the incandescent bulb, and can turn on/off every time the brake is operated. Accordingly, it is possible to provide a new design that is not found in the art, and it is also possible to achieve a lower cost for the lamp than a similar lamp produced with all LED lamps (see JP-A 2003-187613).

The conventional vehicle lamp configured as above makes it possible to provide a new design. The LED lamps serving as the stop lamp are contained in part of the design. Accordingly, for example, the recess with the LED lamps located therein can not shine when the brake is not operated and shines when the brake is operated. Therefore, there is a problem associated with poor design uniformity.

The above configuration is intended to achieve a decoration effect using the function of indicating the vehicle condition such as blinking of the stop lamp. Accordingly, depending on the desired design, the stop lamp, for example, may possibly be interpreted as being provided simply for the purpose of decoration. In such a case, braking of the vehicle is overlooked. Thus, there is another problem because the original purpose (brake indication) can not be achieved.

SUMMARY OF THE INVENTION

As a specific example for solving the above conventional problems and other problems in the art, and in accordance with an aspect of the invention, a vehicle lamp can be provided that includes a first light source located almost at the center of an emission region of the lamp and which has a direction of emission almost coincident with a direction of illumination from the lamp. A transparent cover lens can be arranged to cover the front of the lamp in the direction of illumination from the first light source. The cover lens can include a central reflective portion shaped in a recess and located in front of the first light source to receive light from the first light source and reflect it as light shaped in an almost circular plate toward the entire circumference in a direction almost perpendicular to the direction of illumination. The cover lens can also include a diametrical outer reflective portion located at the rim outside a range set by the first light source as the emission region to receive the light from the first light source and reflect it along the direction of illumination for radial emission. The cover lens can further include a joint portion shaped in an almost plate and made of the same material as those of the central reflective portion and the outer reflective portion and arranged to integrate them with the joint portion.

BRIEF DESCRIPTION OF THE DRAWINGS

These and other features and advantages of the invention will become clear from the following description of exemplary embodiments and with reference to the accompanying drawings, wherein.

DETAILED DESCRIPTION OF PREFERRED EMBODIMENTS

Figure 1:
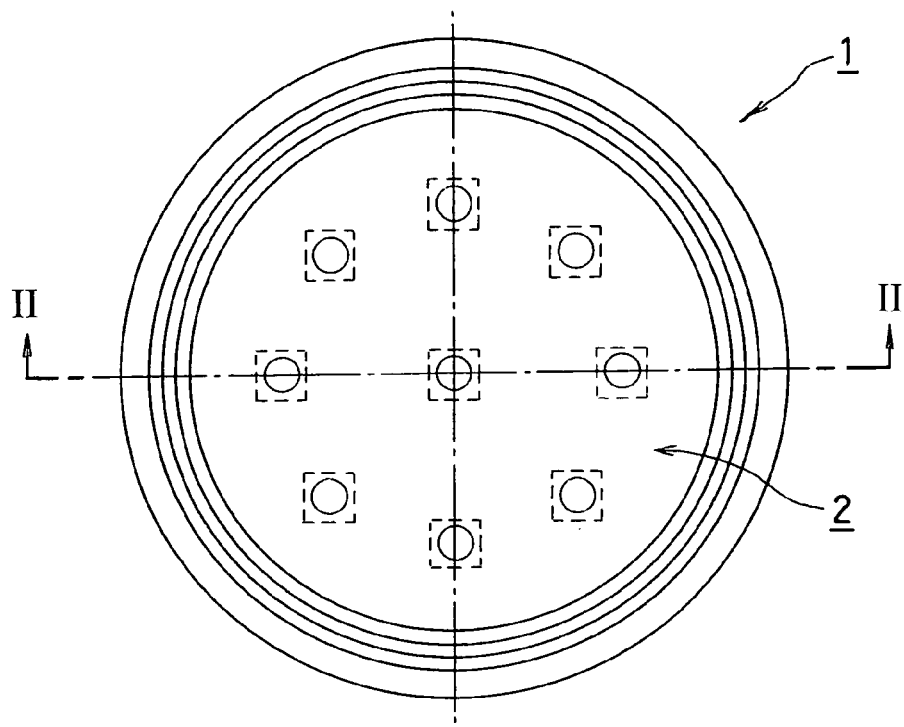
FIG. 1 is a front view showing an embodiment of a vehicle lamp made in accordance with the principles of the invention.

Hereinafter, description will be given of the invention with reference to the drawing figures, wherein like reference numerals designate identical or corresponding elements throughout the several figures. Incidentally, various modifications can be made without departing from the gist of the invention. It is intended that various modifications of the exemplary embodiments described herein can be made and would fall within the scope of the invention.

Figure 2:
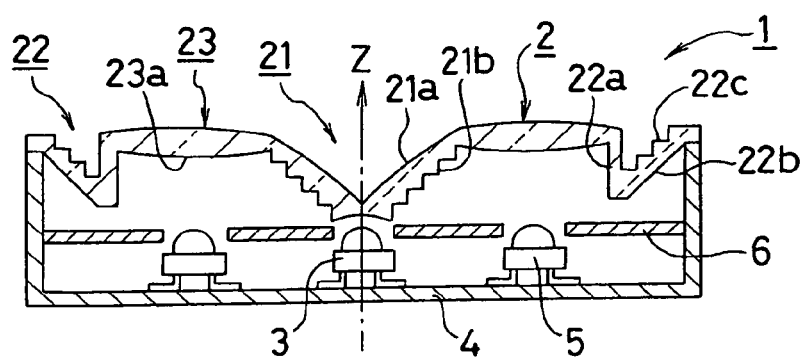
FIG. 2 is a cross-sectional view taken along line II-II in FIG. 1.

The invention will be described in detail based on the embodiments shown in the figures. FIGS. 1 and 2 show a first embodiment of a vehicle lamp 1 made in accordance with the principles of the invention. The vehicle lamp 1 can include a cover lens 2 composed of a transparent material; a first light source 3 located behind the cover lens 2; a substrate 4 arranged to support the first light source 3 in place and supply power thereto; and a functional plate 6 provided, if desired, between the cover lens 2 and the substrate 4. The functional plate 6 will be described in more detail later.

The first light source 3 can be attached almost at the center behind the cover lens 2 with a direction of emission directed substantially along a direction of illumination from the vehicle lamp 1. The substrate 4 can be composed, for example, of a printed circuit board and employed for attachment of the first light source 3 to hold the first light source 3 in place and supply power thereto.

The cover lens 2 can include a central reflective portion 21 located in front of the first light source 3 to receive light from the first light source 3 and reflect it in a direction almost perpendicular to the direction of illumination from the vehicle lamp 1. The central reflective portion 21 can be provided at the front of the lamp 1, in other words, the front of the cover lens 2.

The central reflective portion 21 can be employed for total reflection at the interface between the cover lens 2 (which can be composed of a high-refraction material) and the atmosphere, to convert the direction of traveling light. Accordingly, the central reflective portion 21 can be formed in a conical recess 21a with the apex located at the center of the first light source 3. It receives the light, which enters into inside from behind the cover lens 2 and reaches the interface with the atmosphere, and totally reflects it toward a diametrical outer portion of the cover lens 2.

The light from the first light source 3 has a radiation angle. Accordingly, the conical recess 21a formed as the central reflective portion 21 gradually varies the amount of tilt in accordance with the radiation angle. This allows the light traveling from the center to the rim of the cover lens 2 to be reflected at an angle as close to the right angle as possible relative to a direction (Z) of illumination from the lamp 1.

A first stepped portion 21b having faces formed in parallel with the illumination direction Z can be provided behind the conical recess 21a. The first stepped portion 21b retains the directionality of the light released from the cover lens 2 into the atmosphere and traveling toward the rim of the cover lens 2 such that the light remains at right angle to the illumination direction Z. Therefore, most of the light reflected at the conical recess 21a reaches the rim of the cover lens 2 through the stepped portion 21b.

A diametrical outer reflective portion 22 is provided at the rim of the cover lens 2 to receive the light traveling at a right angle to the illumination direction Z. The diametrical outer reflective portion 22 can redirect this light in the illumination direction Z so that the light can reach a viewer with the aimed decoration effect. A joint portion 23 shaped almost in a concentric plate can be provided between the central reflective portion 21 and the outer reflective portion 22. This joint portion 23 can extend the indication region of the vehicle lamp 1.

The outer reflective portion 22 can include a falling wall 22a formed in parallel with the illumination direction Z to prevent refraction of the light traveling from the central reflective portion 21, which would otherwise vary the directionality. A lens cut 22d may be applied to the falling wall 22a with a certain operation and effect, which will be described later.

A second stepped portion 22c and a reflective surface 22b can be provided behind the falling wall 22a to covert the light that has passed though the falling wall 22a into light that travels again in the illumination direction Z. The second stepped portion 22c can include parallel faces and normal faces relative to the illumination direction Z. The light that has passed though the falling wall 22a can enter the material of the cover lens 2 though the parallel faces relative to the illumination direction Z.

Thereafter, light can be directed to reach the reflective surface 22b, which can be set at 45° to the original traveling direction of light, for example. The reflective surface 22b can inwardly reflect the light to convert the traveling direction of the light to the illumination direction Z, and thus can release the light externally through the surface of the second stepped portion 22c normal to the illumination direction Z. As a result, the diametrical outer portion of the cover lens 2 appears to be shining in a ring from the viewpoint of an outside observer. In this way, the minimal or single first light source 3 causes substantially the entire rim of the cover lens 2 to shine.

The following is a description of the operation and effect of the lens cut 22d that can be applied to the falling wall 22a. The conical recess 21a, the first stepped portion 21b, the falling wall 22a, the reflective surface 22b and the second stepped portion 22c described above can be employed to pass or reflect the light from the first light source 3 and converts the traveling direction of the light. The light emitted from the outer reflective portion 22 and eventually received by a viewer causes the outer reflective portion 22 to appear to shine as a ring with almost uniform brightness, which can provide a desired design effect.

Figure 3:
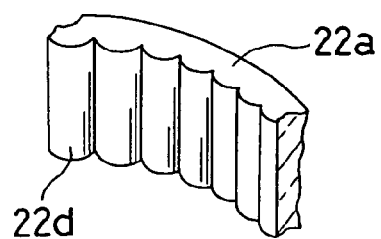
FIG. 3 is a perspective view showing another embodiment of a lens portion of a vehicle lamp made in accordance with the principles of the invention.
Figure 4:
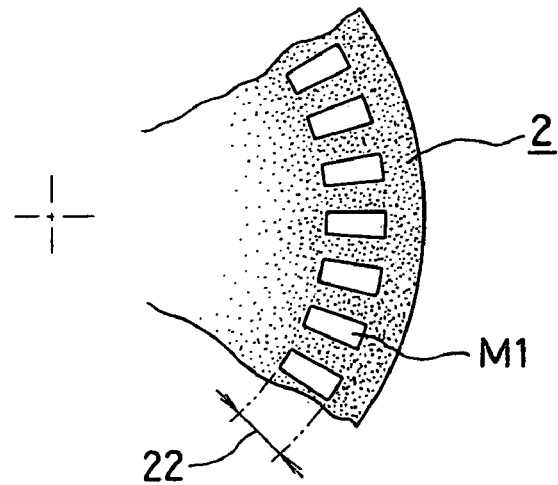
FIG. 4 is an illustrative view showing another embodiment including a decorative pattern in a lens portion of a vehicle lamp made in accordance with the principles of the invention.

The lens cut 22d may be formed in cylindrical lenses having axes along the illumination direction Z of the vehicle lamp 1 and applied to the diametrical inner surface of the falling wall 22a as shown in FIG. 3. In this case, the light can be appropriately converged before it reaches the reflective surface 22b, and reflected therefrom. Thus, the viewer can view a plurality of optical images such as M1 in the form of radiation on the outer reflective portion 22 and in the surface of the cover lens 2, as shown in FIG. 4, which can provide a different desired design.

Figure 5:
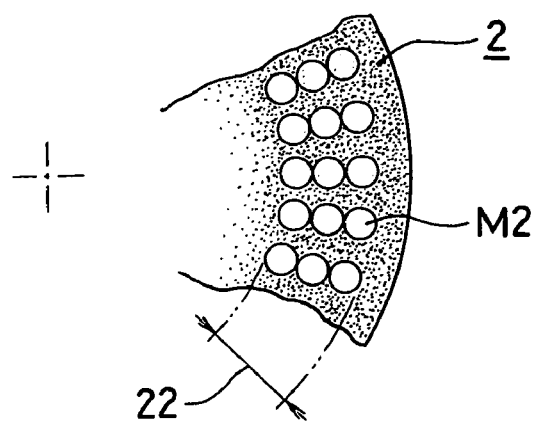
FIG. 5 is an illustrative view showing another decorative pattern for a lamp.

The lens cut 22d may be formed in a fish-eye lens and applied to the diametrical inner surface of the falling wall 22a. In this case, the outer reflective portion 22 allows optical images such as M2 to appear in the form of spots arrayed in both a radial direction and circumferential direction, as shown in FIG. 5, which can provide a design with an improved appearance. It may be difficult to mold such a lens cut, however, because a cylindrical inner diameter causes an undercut portion.

Figure 6:
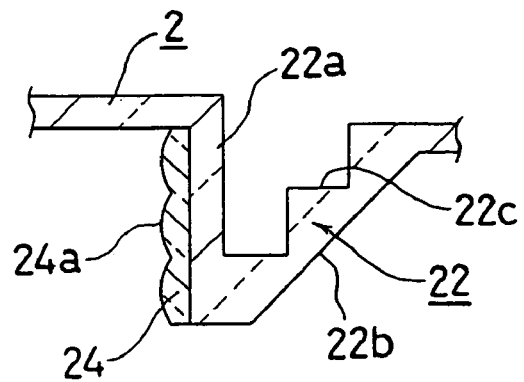
FIG. 6 is an illustrative view of another embodiment showing attachment of a soft plate-like member to a lens to achieve another decorative pattern in accordance with the principles of the invention.

A transparent soft material may be employed to form a soft plate-like member 24 with a lens cut 24a formed in a fish-eye lens 24a on the surface. This member is cut in a shape with a certain width and length, such as a tape. It is then wound around the diametrical inner surface of the falling wall 22a as shown in FIG. 6 and fixed by appropriate means such as adhesion.

The above description is with regard to the decorative part of the vehicle lamp 1. In practice, the vehicle lamp 1 can be configured to function as a brake lamp and so forth. Accordingly, a plurality of second light sources 5 that can be made operative to turn on/off in accordance with respective functional operations, can be attached to the middle place on the substrate between the central reflective portion 21 and the outer reflective portion 22. However, the first light source 3 and the second light sources 5 may be turned on/off at the same time without restraint. Alternatively, the first light source 3 may be normally turned on at night and the second light sources 5 may be turned on in accordance with the operation of the brake without restraint.

Depending on the specific lamp configuration, an interference may occur, for example, when the second light sources 5 intercept the optical path extending from the LED lamp 1 to the central reflective portion 21 and then to the outer reflective portion 22. Such an interference can cause disturbances in decorative patterns that eventually appear on the outer reflective portion 22. Accordingly, for example, it may be preferable to give consideration to locating the second light sources 5 at a one-step-lower height so as not to protrude in the optical path.

In a situation that causes no interference as described above, a distributing lens cut 23a can be freely provided, for example, at the middle place between the central reflective portion 21 and the outer reflective portion 22 of the cover lens 2 as shown in FIG. 2. The lens cut 23a is effective to diffuse the light from the second light sources 5 to achieve an appropriate light distribution.

Figure 7:
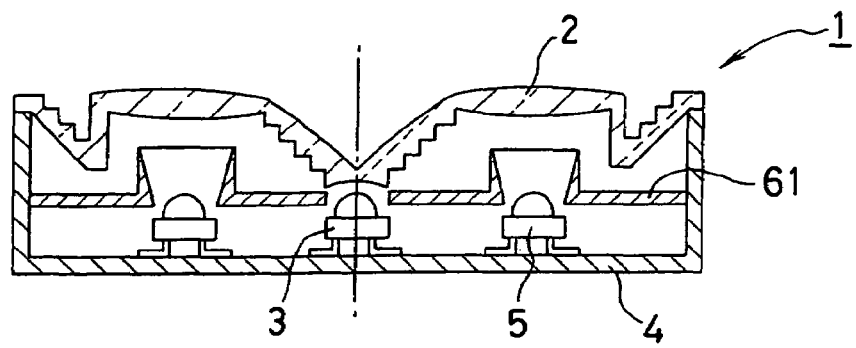
FIG. 7 is a cross-sectional view showing yet another embodiment of a vehicle lamp made in accordance with the principles of the invention.

FIG. 7 shows yet another embodiment of the invention, in which the second light source 5 is provided behind the joint portion 23 of the cover lens 2. In this case, if the joint portion 23 is narrow in width, the light emitted from the second light source 5 may also enter the central reflective portion 21 or the outer reflective portion 22. As a result, the design formed on the outer reflective portion 22 by the second light source 5 together with the first light source 3 may suffer mixture of colors and thus lack sharpness.

In such a case it is may be helpful to give consideration to using structures for achieving the original design. For example, a functional plate 61 composed of an opaque resin can be attached to an appropriate place between the cover lens 2 and the substrate 4 to limit the angle of light radiated from the second light source 5. In contrast, if there is a portion lacking in the amount of light, a reflective surface can be formed on an appropriate portion of the functional plate 6 (or 61) by, for example, aluminum evaporation to direct supplemental light to the portion lacking light.

Thus, it is possible to express beautiful decorative patterns of light on and from the lens surface. This is extremely effective to improve the beauty of the vehicle at night in particular. The first light source 3 and the second light source 5 can be turned on/off at the same time. Alternatively, the first light source 3 can be normally turned on if it has an emission color, such as white, that is not confused with one that indicates a vehicle function.

It is easy for the first light source 3 to achieve the above-described operation if it has an appropriate illumination angle. To this end, the use of an LED lamp is effective. Alternatively, it may be implemented by means of an incandescent lamp with a socket or a reflector, not shown, to adjust the illumination angle appropriately. The second light source 5 may also include a light source of either an LED lamp or an incandescent lamp with the use of the functional plate 6, 61 as described above.

Figure 8:
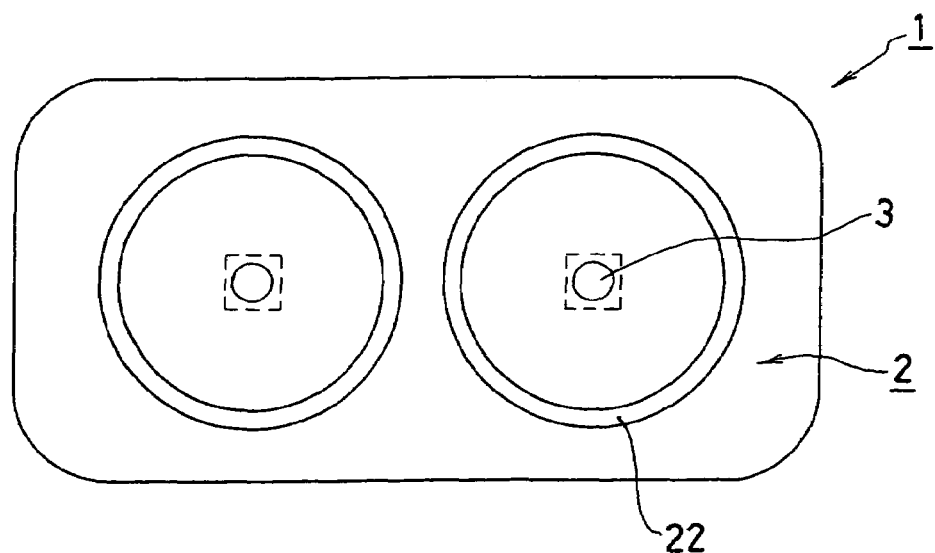
FIG. 8 is a front view showing yet another embodiment of a vehicle lamp made in accordance with the principles of the invention.

The invention is not limited to the example with the single first light source 3 and the disc-like cover lens 2 as shown in FIGS. 1 and 2. For example, plural first light sources 3 may be provided within an almost rectangular cover lens 2, as shown in FIG. 8. In this case, respective outer reflective portions 22 can be provided at rims that are located at ranges defined by emission regions formed by respective first light sources 3 to define plural zones in the cover lens 2 to further increase variations in design.

Having described exemplary embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A vehicle lamp, comprising:
   a first light source;
   a cover lens located adjacent the first light source, the cover lens including first means for receiving light from the first light source and reflecting light from the first light source into a first direction, the first direction being radially outwardly and substantially perpendicular to a direction of illumination of the lamp, the cover lens further including second means for taking the light traveling in the first direction and reflecting the light traveling in the first direction into a second direction, the second direction being substantially perpendicular to the first direction and in a substantial ring shape in the direction of illumination of the lamp, the cover lens including
   a joint portion located between the first means and second means, and
   a second light source located adjacent to and configured to transmit light towards the joint portion.

2. The vehicle lamp of claim 1, wherein the cover lens, first means, and second means are integrally formed from a transparent material.

3. The vehicle lamp of claim 1, wherein the first light source is located behind and is capable of transmitting light into the first means.

4. A vehicle lamp having a direction of illumination, comprising:
   a first light source;
   a cover lens located adjacent the first light source, the cover lens including,
      a central reflective portion shaped as a recess as viewed from a front of the lamp, the central reflective portion configured to receive light from the first light source and reflect light from the first light source as second light radiating in a substantial circular plate shape and in a direction substantially perpendicular to the direction of illumination,
      an outer reflective portion located at an outer periphery of the lens and configured to receive the second light and reflect the second light along the direction of illumination and in a substantial ring shape, and
      a joint portion located between the central reflective portion and the outer reflective portion; and
   a second light source located adjacent the joint portion.

5. The vehicle lamp of claim 4, wherein the central reflective portion, outer reflective portion, and joint portion are made of the same material and integral with each other.

6. The vehicle lamp of claim 4, wherein the joint portion is located in front in the direction of illumination of the second light radiating in a substantial circular plate shape.

7. The vehicle lamp of claim 4, wherein the first and second light sources each have an emission color that is different with respect to each other.

8. The vehicle lamp of claim 4, further comprising:
   a functional plate located adjacent one of the first and second light sources and configured to limit the angle of light radiated from one of the first and second light sources.

9. The vehicle lamp according to claim 4, wherein the first light source is an LED light source.

10. The vehicle lamp according to claim 4, wherein the joint portion includes a rear surface and a front surface spaced from the rear surface in the illumination direction of the vehicle lamp, the joint portion configured such that the second light is spaced from the rear surface of the joint portion in a direction opposite the illumination direction.

11. A vehicle lamp having an emission region and a direction of illumination, comprising:
   a first light source located substantially at a center of the emission region of the lamp and configured to produce light having a direction of emission substantially coincident with the direction of illumination of the lamp;

a transparent cover lens arranged adjacent the first light source, the cover lens including a central reflective portion shaped as a recess and located in front of the first light source, the central reflective portion located and configured such that the central reflective portion receives light from the first light source and reflects light from the first light source as light shaped in a substantially circular plate outwardly and in a direction substantially perpendicular to the direction of illumination, a diametrical outer reflective portion located at a rim outside the emission region and configured to receive the light from the first light source and reflect light from the first light source along the direction of illumination for the lamp, and a joint portion shaped in a substantial plate shape and integral with the central reflective portion and the outer reflective portion; and a second light source located behind a rear portion of the cover lens and adjacent to the joint portion.

12. The vehicle lamp according to claim 11, wherein the joint portion is located in front in the direction of illumination of the light shaped in a substantially circular plate.

13. The vehicle lamp according to claim 11, wherein the first light source is an LED light source, and the first and second light sources have emission colors that are substantially similar.

14. The vehicle lamp according to claim 11, wherein the first and second light sources each have an emission color that is different with respect to each other.

15. The vehicle lamp according to claim 14, wherein the second light source includes a device configured to turn the second light source on/off independent of the first light source.

16. The vehicle lamp according to claim 14, wherein the first light source is an LED light source.

17. The vehicle lamp according to claim 11, wherein the cover lens is configured to cover a front of the lamp in the direction of illumination.

18. The vehicle lamp according to claim 11, wherein the emission region is defined by a range set by the first light source.

19. The vehicle lamp according to claim 11, wherein the cover lens includes a falling wall portion and an angled reflective surface located about an outer periphery of the cover lens.

20. The vehicle lamp according to claim 11, wherein the joint portion includes a rear surface and a front surface spaced from the rear surface in the direction of illumination, the joint portion configured such that the light shaped in a substantially circular plate is spaced from the rear surface of the joint portion in a direction opposite the illumination direction.

* * * * *